(12) United States Patent
Itomi

(10) Patent No.: US 11,976,696 B2
(45) Date of Patent: May 7, 2024

(54) ONE-WAY CLUTCH AND REVERSE INPUT PREVENTIVE CLUTCH

(71) Applicant: NTN Corporation, Osaka (JP)

(72) Inventor: Shoji Itomi, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/027,784

(22) PCT Filed: Sep. 14, 2021

(86) PCT No.: PCT/JP2021/033672
§ 371 (c)(1),
(2) Date: Mar. 22, 2023

(87) PCT Pub. No.: WO2022/065128
PCT Pub. Date: Mar. 31, 2022

(65) Prior Publication Data
US 2023/0341009 A1     Oct. 26, 2023

(30) Foreign Application Priority Data

Sep. 23, 2020  (JP) .................................. 2020-158484

(51) Int. Cl.
*F16D 41/067*     (2006.01)
*F16D 41/06*      (2006.01)

(52) U.S. Cl.
CPC .... *F16D 41/067* (2013.01); *F16D 2041/0605* (2013.01)

(58) Field of Classification Search
CPC . F16D 41/067; F16D 2041/0605; F16D 43/21
See application file for complete search history.

(56) References Cited

U.S. PATENT DOCUMENTS 10,001,178 B2 *   6/2018  Iwano .................... F16D 15/00

FOREIGN PATENT DOCUMENTS

| JP | 2-84041 | 6/1990 |
|---|---|---|
| JP | 3989702 | 7/2007 |
| JP | 2007-192314 | 8/2007 |
| JP | 2017-215021 | 12/2017 |
| JP | 6633277 | 12/2019 |

OTHER PUBLICATIONS

English language translation of International Preliminary Report on Patentability dated Mar. 28, 2023 in corresponding International (PCT) Patent Application No. PCT/JP2021/033672.

* cited by examiner

*Primary Examiner* — Huan Le
(74) *Attorney, Agent, or Firm* — WENDEROTH, LIND & PONACK, L.L.P.

(57) ABSTRACT

A one-way clutch includes a C-shaped spring having one end thereof engaged by the inner ring and the other end abutting a roller at one end of a row of rollers that abut each other, thereby engaging the rollers with the outer ring and the inner ring. The inner ring has a radius at the engaging end of the cam surface opposed to the roller at the other end of the row of the rollers larger than its radii at the engaging ends of the cam surfaces opposed to the other rollers of the same row.

4 Claims, 7 Drawing Sheets

ONE-WAY CLUTCH AND REVERSE INPUT PREVENTIVE CLUTCH

TECHNICAL FIELD

The present invention relates to a one-way clutch and a reverse input preventive clutch in which rolling elements as engaging elements are mounted while abutting each other.

BACKGROUND ART

In many one-way clutches, a plurality of cam surfaces inclined in one predetermined direction are formed on one of the inner peripheral surface of the outer member and the outer peripheral surface of the inner member, with the other being a cylindrical surface, to define, between the outer member and the inner member, a plurality of wedge-shaped spaces that narrow in one circumferential direction. Rolling elements as engaging elements that are received in the respective wedge-shaped spaces are pushed into the narrow portions of the respective wedge-shaped spaces by a resilient member, and engage the inner member and the outer member. Thus, when one of the inner member and the outer member rotates in a predetermined direction, the two members are locked together and torque is transmitted to the other of the two members, and when the one of the two rotates in the opposite direction, the two members are unlocked and only the one of the two idles.

In some of such one-way clutches, in order to increase the torque transmission capability by increasing the number of rolling elements, the rolling elements are mounted such that all of the rolling elements abut the adjacent rolling elements (if the rolling elements are rollers, such a clutch is called the "full roller clutch"). In one of such full roller one-way clutches, a C-shaped spring as a resilient member is mounted between the outer member and the inner member to extend along a row of the rollers, with a hook portion at one end of the C-shaped spring engaging the outer member or the inner member and a hook portion at the other end abutting the roller at one end of the row of the rollers, thereby transmitting its biasing force to all of the rollers and pushing the rollers into the narrow portions of the respective wedge-shaped spaces (see Japanese Patent No. 3989702).

On the other hand, reverse input preventive clutches are configured such that, when input torque is applied to an input member, its rotation is transmitted to the output member, and when reverse input torque is applied to an output member, the input member does not rotate.

In one specific structure of this reverse input preventive clutch, between an input member and an output member that rotate about a common axis, a torque transmission mechanism is provided which is configured to transmit rotation of the input member to the output member with a slight angular delay. Formed on an outer peripheral surface of the output member are first groups of cam surfaces, each first group being composed of a plurality of cam surfaces continuous with each other and inclined in one predetermined direction, and second groups of cam surfaces, each second group being composed of a plurality of cam surfaces continuous with each other and inclined in the other direction, and a fixed member is provided having a cylindrical surface opposed to the cam surfaces. Thus, between the output member and the fixed member, first groups of wedge-shaped spaces, each group being composed of a plurality of wedge-shaped spaces continuous with each other and narrowing in one circumferential direction, and second groups of wedge-shaped spaces, each group being composed of a plurality of wedge-shaped spaces continuous with each other and narrowing in the other circumferential direction, are formed. Rollers as rolling elements that serve as engaging elements are received in the respective wedge-shaped spaces such that the rolling elements in each of the first and second groups of the wedge-shaped spaces are arranged in a row and abut each other. C-shaped springs (resilient members) extend along the rows of the rollers. Each of the C-shaped springs has a hook portion at each end thereof which abuts the roller at one end of one of the rows of rollers, to push the rollers into the narrow portions of the respective wedge-shaped spaces of the first and second groups, thereby engaging the rollers with the fixed member and the output member. Pillars of the cage which is coupled to the input member so as to rotate in unison with the input member are each inserted into a position where one of the wedge-shaped spaces of one of the first groups is circumferentially opposed to one of the wedge-shaped spaces of one of the second groups. (See Japanese Patent No. 6633277)

In the reverse input preventive clutch disclosed in Japanese Patent No. 6633277, because the rollers in the wedge-shaped spaces of the first groups or the second groups are, under the biasing force of the C-shaped springs, pushed into the narrow portions of the respective wedge-shaped spaces, and engage the fixed member and the output member, reverse input torque in either direction will cause the output member to be locked to the fixed member, and the input member does not rotate either. On the other hand, when the input member rotates in either direction due to input torque applied to the input member, the pillars of the cage, which rotate in unison with the input member, push the rollers in the wedge-shaped spaces of the first groups or second groups into the wide portions of the respective wedge-shaped spaces, thereby unlocking the output member, and then the torque transmission mechanism disposed between the input member and the output member transmits torque to the output member, and thereby transmitting torque to the output member, and rotating the output member.

Patent Document 1: Japanese Patent No. 3989702
Patent Document 2: Japanese Patent No. 6633277

In a clutch of the type in which, as in Japanese Patent Nos. 3989702 and 6633277, the rollers abut each other, the circumferential lengths of the cam surfaces, which are formed corresponding to the circumferential pitches of the rollers, tend to be short. Thus, especially in a case in which the cam surfaces are formed on the outer peripheral surface of a member (inside member) that engages the rollers at a position radially inwardly of the row of the rollers (the inner member of a one-way clutch or the output member of a reverse input preventive clutch), the difference between the dimension from the axis of the inside member to the wide portion of each wedge-shaped space (radius of the inside member at the disengaging end of the cam surface) and to its narrow portion (radius of the inside member at the engaging end) is small, which means that the height of the step between each adjacent continuous pair of the cam surfaces is small.

As a result, when large torque is applied to the inside and outside members, which engage each other via the rollers, in the direction in which the rollers are relatively pushed into the narrow portions of the wedge-shaped spaces, each roller could move over the engaging end of the cam surface into the adjacent wedge-shaped space (this phenomenon is hereinafter referred to as the "roll-over". If the roll-over occurs, the inside and outside members are not locked together, so that in the case of a one-way clutch, the torque transmission behavior becomes unstable, and in the case of a reverse input preventive clutch, the input member is rotated by reverse input torque.

SUMMARY OF THE INVENTION

An object of the present invention is, in a one-way clutch and a reverse input preventive clutch of the type in which rolling elements as engaging elements are mounted abutting each other, and cam surfaces are formed on a member engaging the rolling elements at a position radially inward of the row or rows of the rolling elements, to prevent roll-over of the rolling elements.

In order to achieve this object, the present invention provides a one-way clutch wherein: an inner peripheral surface of an outer member is a cylindrical surface, and on an outer peripheral surface of an inner member disposed inside the outer member, a plurality of cam surfaces are formed which are arranged in a row and inclined in one predetermined direction, such that wedge-shaped spaces each having a narrow portion on one circumferential side thereof are defined between the outer member and the inner member; rolling elements are received in the respective wedge-shaped spaces while abutting each other; and a resilient member engaged by the outer member or the inner member abuts a rolling element disposed at one end of the row of the rolling elements, which abut each other, so as to push the respective rolling elements into narrow portions of the corresponding ones of the wedge-shaped spaces until the rolling elements engage the outer member and the inner member, wherein a radius of the inner member at an engaging end of a cam surface opposed to one of the rolling elements disposed at the other end of the row of the rolling elements, which abut each other, is larger than radii of the inner member at engaging ends of the cam surfaces opposed to the other rolling elements of the row.

In this one-way clutch, even when large input torque is applied to one of the outer member and the inner member in the direction in which the rolling elements are relatively pushed into the narrow portions of the wedge-shaped spaces, the rolling elements are less likely to move over the engaging ends of the respective wedge-shaped spaces, that is, roll-over of the rolling elements can be prevented effectively.

In an arrangement in which the cam surfaces of the inner member are each formed by a radially outwardly-facing convex circular arc-shaped surface, a circular arc radius of the cam surface opposed to the rolling element at the other end of the row of the rolling elements, which abut each other, is set larger than the circular arc radii of the cam surfaces opposed to the other rolling elements of the row. In this case, a circular arc radius of the cam surface opposed to the rolling element at the other end of the row of the rolling elements, which abut each other, is preferably not less than 1.5 times the circular arc radii of the cam surfaces opposed to the other rolling elements of the row.

Alternatively, of the cam surfaces of the inner member, the cam surface opposed to the rolling element at the other end of the row of the rolling elements, which abut each other, may be formed by a flat surface or a radially outwardly-facing concave circular arc-shaped surface.

Further, in a reverse input preventive clutch wherein; between an input member and an output member that rotate about a common axis, a torque transmission mechanism is provided which is configured to transmit rotation of the input member to the output member with a slight angular delay; formed on an outer peripheral surface of the output member are first groups of cam surfaces, each first group being composed of a plurality of cam surfaces continuous with each other and inclined in one predetermined direction, and second groups of cam surfaces, each second group being composed of a plurality of cam surfaces continuous with each other and inclined in the other direction, and a fixed member is provided having a cylindrical surface opposed to the cam surfaces, such that, between the output member and the fixed member, first groups of wedge-shaped spaces, each group being composed of a plurality of wedge-shaped spaces continuous with each other and narrowing in one circumferential direction, and second groups of wedge-shaped spaces, each group being composed of a plurality of wedge-shaped spaces continuous with each other and narrowing in the other circumferential direction, are defined; rolling elements are received in the respective wedge-shaped spaces such that the rolling elements in each of the first and second groups of the wedge-shaped spaces are arranged in a row and abut each other; resilient members are provided that abut the rolling element at one end of each row of the rolling elements such that under the biasing force of the resilient members, each of the rolling elements is pushed into the narrow portion of one of the wedge-shaped spaces of one of the first or second groups such that the rolling elements engage the fixed member and the output member; pillars of a cage which is coupled to the input member so as to rotate in unison with the input member are each inserted into a position where one of the wedge-shaped spaces of one of the first groups is circumferentially opposed to one of the wedge-shaped spaces of one of the second groups; and a radius of the output member at an engaging end of one of the cam surfaces opposed to the rolling element disposed at the other end of each row of the rolling elements, which abut each other, is larger than radii of the output member at engaging ends of the cam surfaces opposed to the other rolling elements of the same row.

In this reverse input preventive clutch, even when large reverse input torque is applied to the output member, the rolling elements are less likely to move mover the engaging ends of the respective cam surfaces, that is, roll-over of the rolling elements can be prevented effectively.

In an arrangement in which the cam surfaces of the output member are each formed of radially outwardly-facing convex circular arc-shaped surface, the circular arc radius of the cam surface opposed to the rolling element at the other end of each row of the rolling elements, which abut each other, is set larger than the circular arc radii of the cam surfaces opposed to the other rolling elements of the same row. In this case, the circular arc radius of the cam surface opposed to the rolling element at the other end of each row of the rolling elements, which abut each other, is preferably set not less than 1.5 times the circular arc radii of the cam surfaces opposed to the other rolling elements of the same row.

Alternatively, of the cam surfaces of the output member, the cam surface opposed to the rolling element disposed at the other end of each row of the rolling elements, which abut each other, may be formed of one of a flat surface and a radially outwardly-facing concave circular arc-shaped surface.

The present invention provides in a one-way clutch and a reverse input preventive clutch, means for preventing roll-over of the rolling elements, such that in the case of a one-way clutch, stable transmission is possible even when large input torque is applied, and in the case of a reverse input preventive clutch, rotation of the input member is reliably blocked even when large reverse input torque is applied.

DETAILED DESCRIPTION OF THE INVENTION

Figure 1:
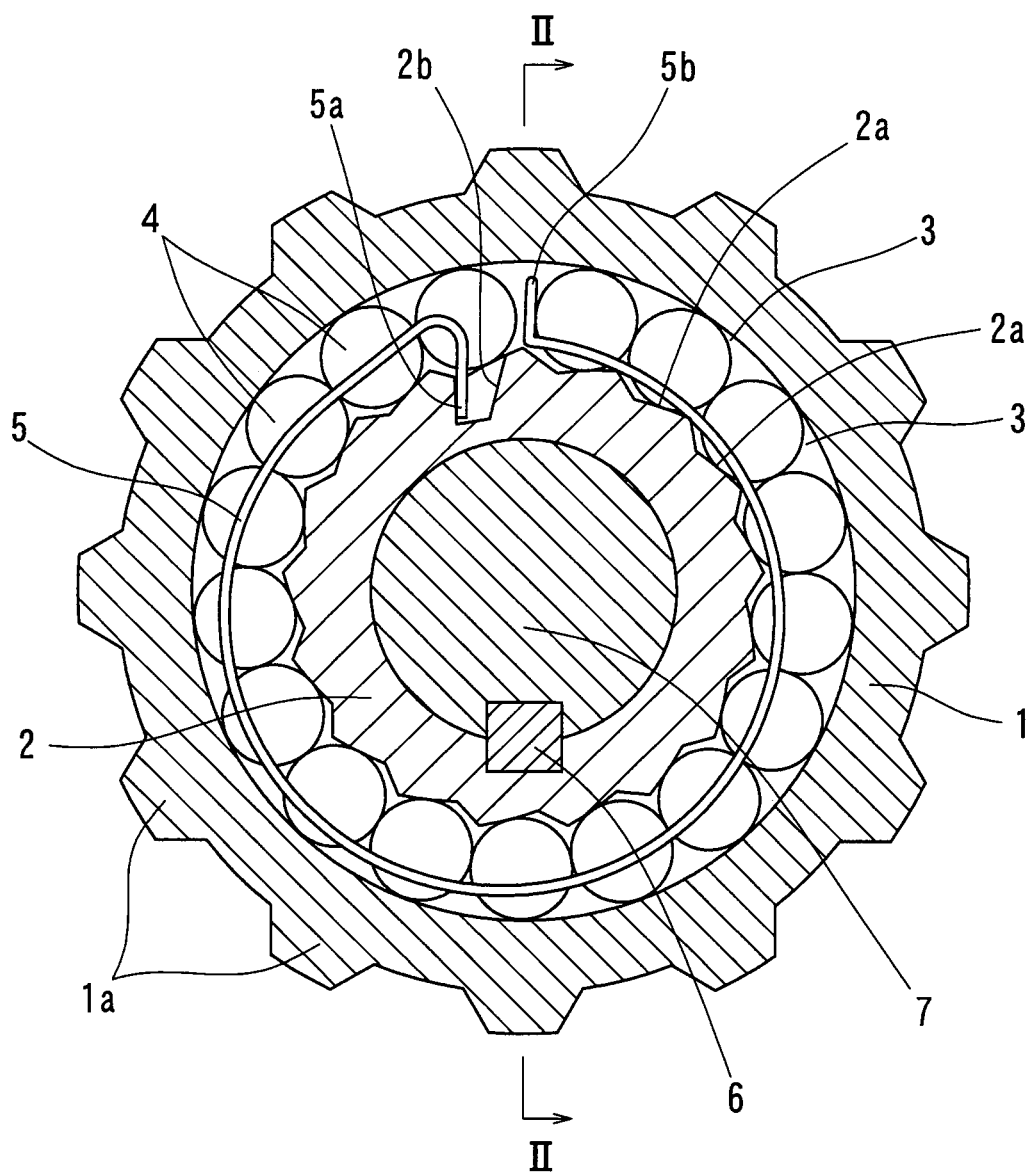
FIG. 1 is a vertical sectional front view of a one-way clutch of the first embodiment.
Figure 2:
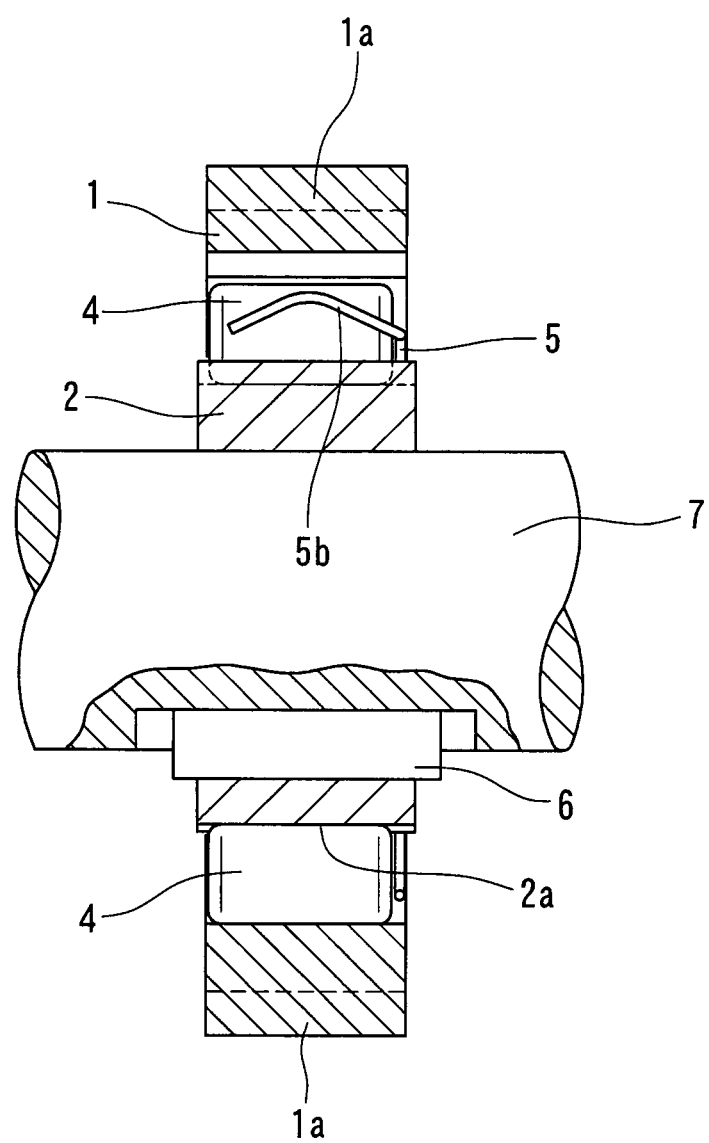
FIG. 2 is a sectional view taken along line II-II of FIG. 1.
Figure 3:
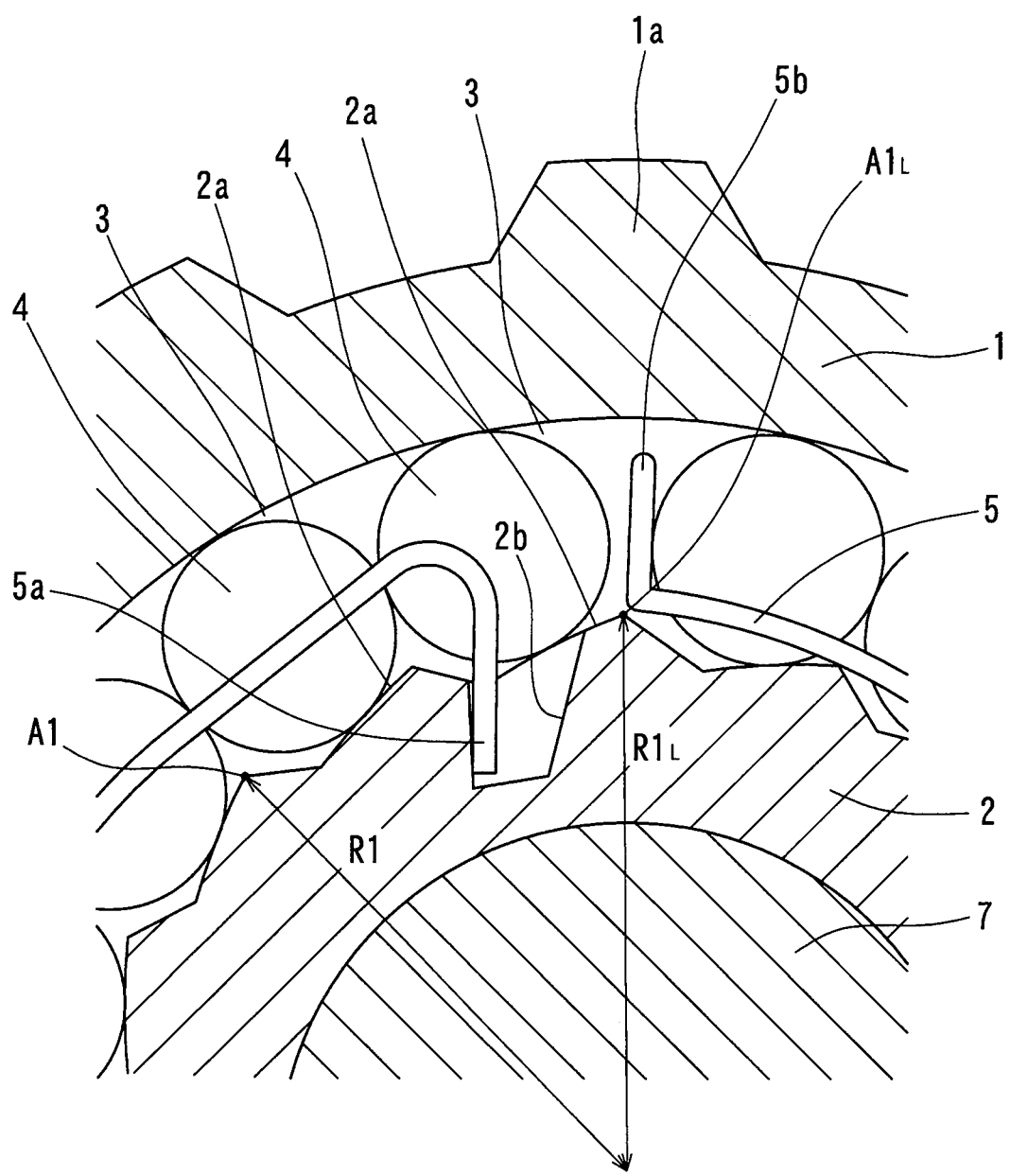
FIG. 3 is an enlarged vertical sectional front view of a portion of FIG. 1.

The embodiments of the present invention are now described with reference to the drawings. FIGS. 1 to 3 show a one-way clutch of the first embodiment. This one-way clutch is, as shown in FIGS. 1 and 2, a full roller clutch in which: the inner peripheral surface of an outer ring (outer member) 1 is cylindrically shaped, and on the outer peripheral surface of an inner ring (inner member) 2, which is inserted through the outer ring 1, a plurality of cam surfaces 2a inclined in a predetermined one direction are disposed continuously, so as to continuously define, between the inner ring and the outer ring, a plurality of wedge-shaped spaces 3 which are narrow on the same circumferential side; rollers (rolling elements as an engaging elements) 4 are received, while abutting each other, in the respective wedge-shaped spaces 3; and a C-shaped spring 5 is positioned between the outer ring 1 and the inner ring 2 so as to extend along the row of the rollers 4, to thereby push the rollers 4 into the narrow portions of the respective wedge-shaped spaces.

On the outer peripheral surface of the outer ring 1, a plurality of axially extending ribs 1a, as torque transmission mechanism, are integrally formed. The inner ring 2 is fixed to the outer periphery of a rotary shaft 7 via a key 6, and at one circumferential portion of the outer peripheral surface thereof, an engaging groove 2b is provided for engaging one end of the C-shaped spring 5, as described later. The cam surfaces 2a of the inner ring 2 are formed by radially outwardly-facing convex circular arc surfaces.

The C-shaped spring 5 is made from a round wire, and has at one end thereof a hook portion 5a extending straight radially inwardly of the clutch, and at the other end a substantially "<" (Japanese character)-shaped hook portion 5b extending in the axial direction of the clutch.

The C-shaped spring 5 is mounted while being elastically radially inwardly compressed, with the hook portion 5a at one end thereof engaged by one side wall of the engaging groove 2b of the inner ring 2, and its hook portion 5b at the other end abutting the roller 4 at one end of the row of the rollers 4, which abut each other, in the vicinity of the other side wall of the engaging groove 2b of the inner ring 2. Thus, the pressing force by the elastic force of the C-shaped spring 5 is transmitted from the roller 4 abutting the C-shaped spring 5 to all of the other rollers 4, and as a result, the rollers 4 are pushed into the narrow portions of the respective wedge-shaped spaces 3, engaging the outer ring 1 and the inner ring 2.

Also, as shown in FIG. 3, by setting the circular arc radius of the cam surface 2a opposed to the roller 4 at the other end of the row of the rollers 4, which abut each other (this cam surface is herein after referred to as the "last cam surface"), to not less than 1.5 times the circular arc radii of the cam surfaces 2a opposed to the other rollers 4 of the row (these cam surfaces are hereinafter referred to as "the other cam surfaces"), the inner ring 2 has a radius $R1_L$ at the engaging end $A1_L$ of the last cam surface 2a larger than its radii R1 at the engaging ends A1 of the other cam surfaces 2a.

This one-way clutch is configured such that when, with input torque applied to the outer ring 1, the outer ring 1 rotates clockwise in FIG. 1, the outer ring 1 and the inner ring 2 are locked together via the rollers 4 and the torque of the outer ring 1 is applied to the inner ring 2, and when the outer ring 1 rotates counterclockwise, the outer ring 1 and the inner ring 2 are unlocked, and the outer ring 1 idles alone. Conversely, when, with input torque applied to the inner ring 2 from the rotary shaft 7 via the key 6, the inner ring 2 rotates counterclockwise, the torque is transmitted to the outer ring 1, and when the inner ring 2 rotates clockwise, the inner ring 2, the rollers 4 and the C-shaped spring 5 idle in unison.

Because, in this one-way clutch, the inner ring 2 has a radius $R1_L$ at the engaging end $A1_L$ of the last cam surface 2a that is larger than the radii R1 of the inner ring 2 at the engaging ends A1 of the other cam surfaces 2a, the rollers 4 are less likely to move over the engaging ends A1 and $A1_L$ of the cam surfaces 2a of the inner ring 2. Thus, even in a situation where a large input torque is applied to one of the inner ring and the outer ring in the direction in which the rollers 4 are relatively pushed into the narrow portions of the respective wedge-shaped spaces (direction in which torque is transmitted between the outer ring 1 and the inner ring 2), roll-over of the rollers 4 is prevented, which in turn ensures stable transmission.

While it is preferable, as described above and shown in FIGS. 1 to 3, to form the cam surfaces 2a of the inner ring 2 as radially outwardly-facing convex circular arc surfaces, with the last cam surface 24 having a circular arc radius of not less than 1.5 times the circular arc radii of the other cam surfaces, they are not essential features provided the radius $R1_L$ at the engaging end $A1_L$ of the last cam surface 2a is larger than the radii R1 at the engaging ends A1 of the other cam surfaces 2a.

Figure 4A:
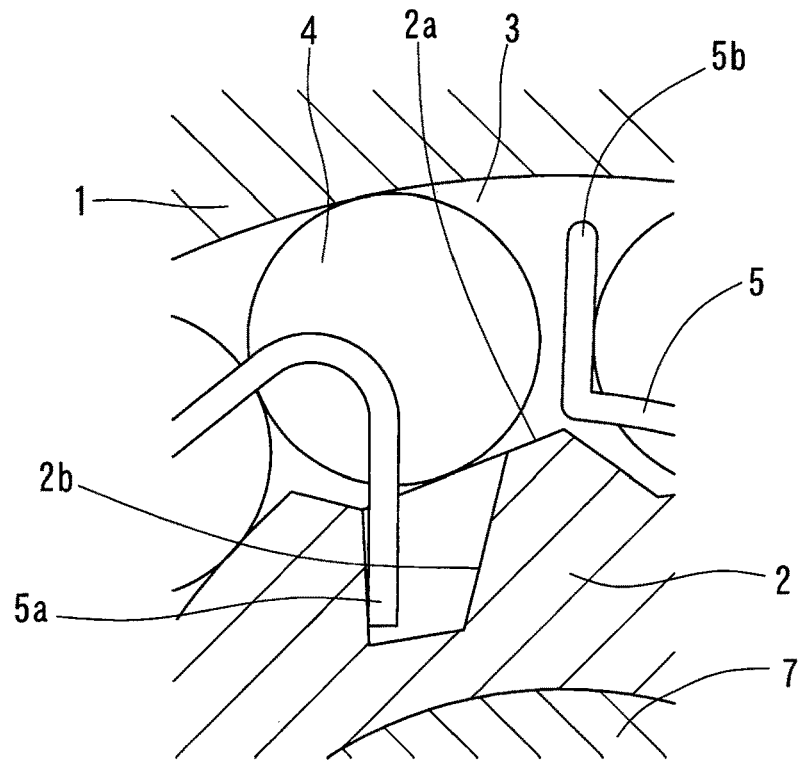
FIG. 4A is a vertical sectional front view showing modified cam surfaces of the inner ring of FIG. 1.
Figure 4B:
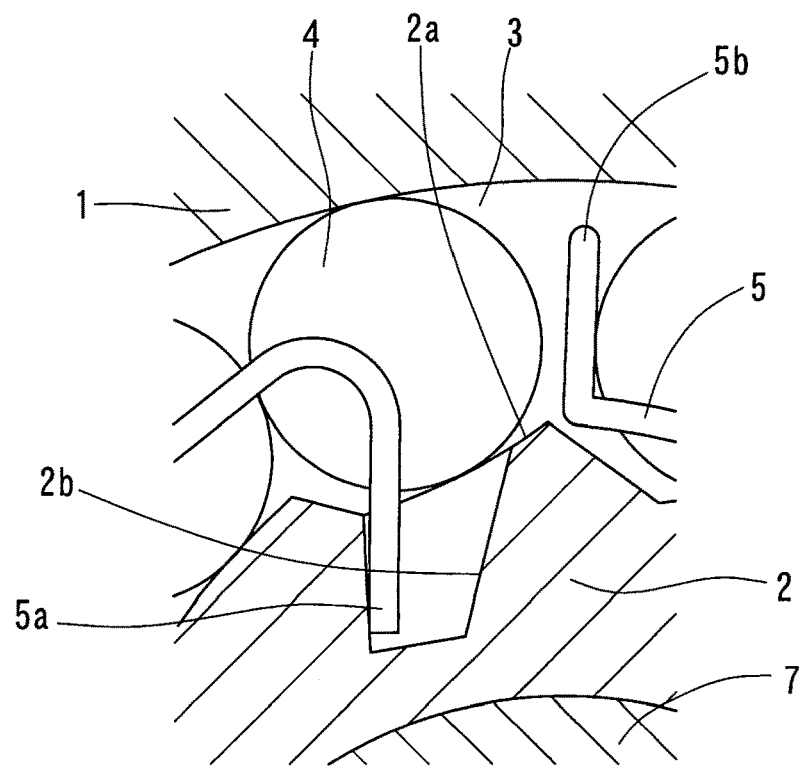
FIG. 4B is a vertical sectional front view showing modified cam surfaces of the inner ring of FIG. 1.

Thus, for example, the last cam surface 2a may be formed as a flat surface as shown in FIG. 4A, or as shown in FIG. 4B, as a radially outwardly-facing concave circular arc surface.

Figure 5:
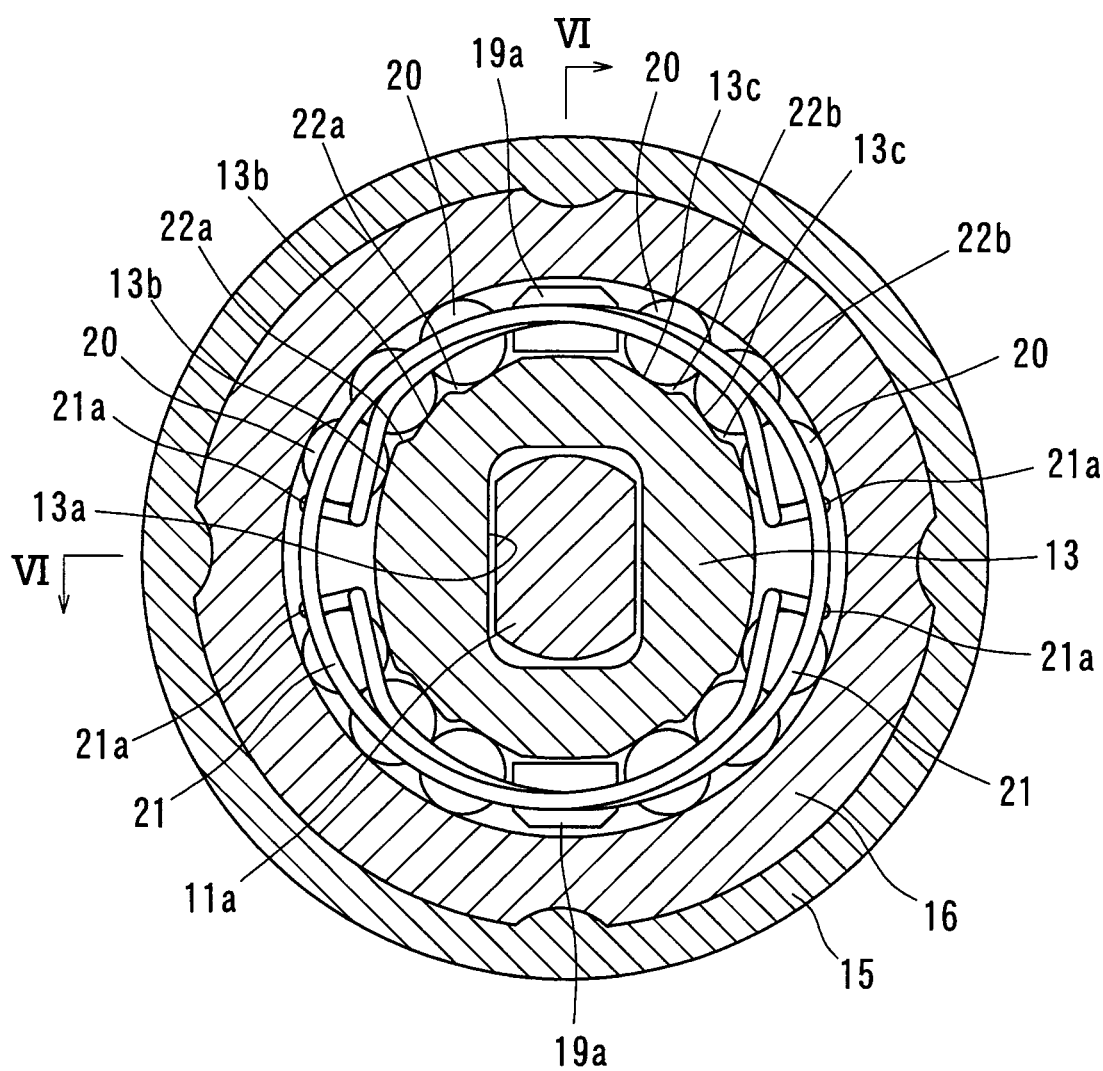
FIG. 5 is a vertical sectional front view of the reverse input preventive clutch of the second embodiment
Figure 6:
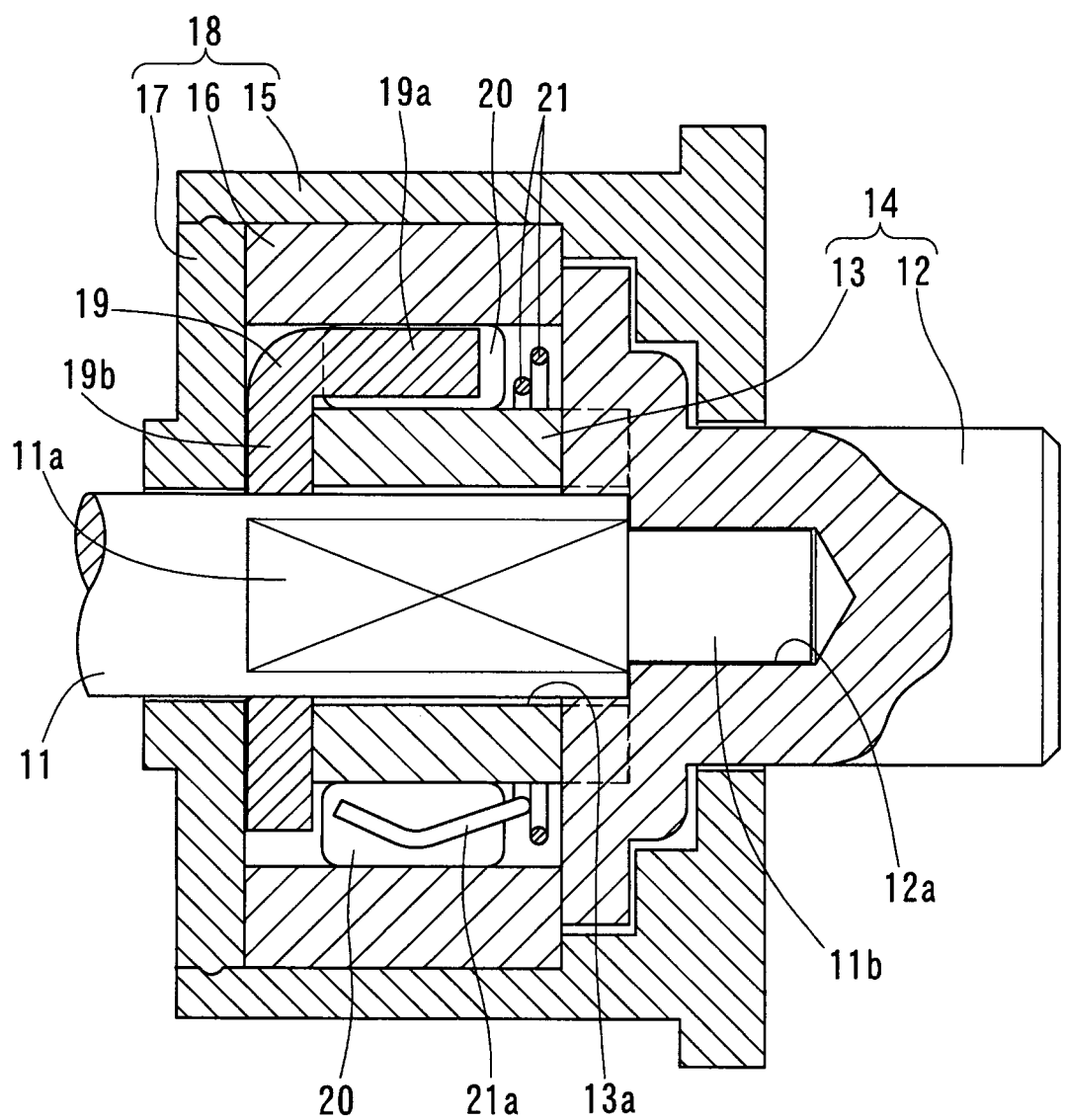
FIG. 6 is a sectional view taken along VI-VI of FIG. 5.
Figure 7:
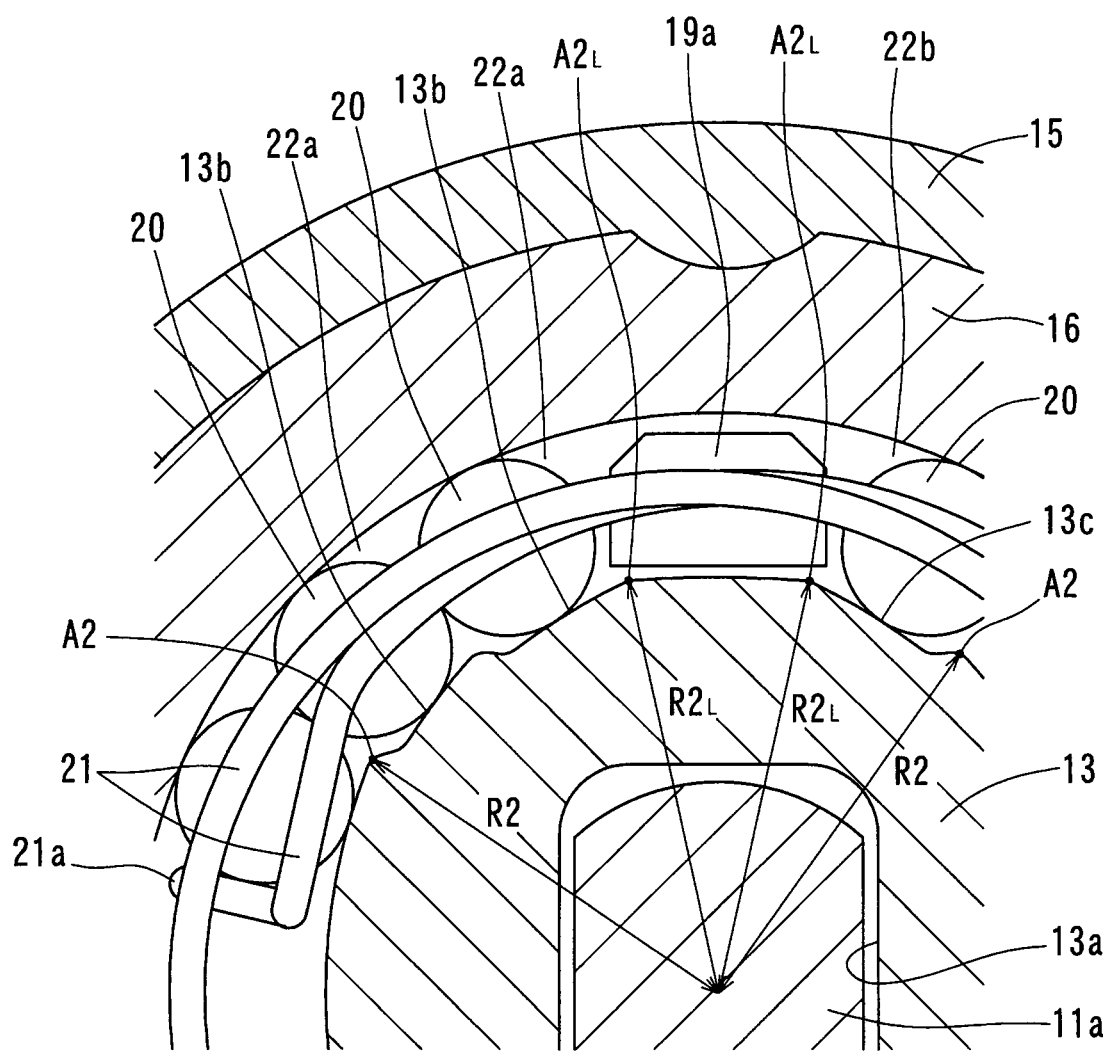
FIG. 7 is an enlarged vertical sectional front view of a portion of FIG. 5.

FIGS. 5 to 7 show a reverse input preventive clutch as a second embodiment. The reverse input preventive clutch includes, as shown in FIGS. 5 and 6, an input shaft (input member) 11; an output member 14 comprising an output shaft 12 and an inner ring 13; a fixed member 18 comprising a housing 15, an outer ring 16 and a presser lid 17; a retainer (cage) 19 having two pillars 19a inserted between the inner ring 13 and the outer ring 16; rollers (rolling elements as engaging elements) 20 placed between the two pillars 19a of the retainer 19; and two C-shaped springs 21 disposed between the inner ring 13 and the outer ring 16 to extend along the rows of the rollers 20.

The input shaft 11 includes an engaging portion 11a disposed near the distal end thereof, and having two width-defining surfaces defining the width of the engaging portion. The engaging portion 11a is inserted in an engaging hole 13a provided in the center of the inner ring 13. The input shaft 11 further includes a small-diameter distal end portion 11b fitted in a shaft hole 12a provided in the center of the end surface of the output shaft 12 such that the input shaft 11 and the output shaft 12 rotate on a common axis.

The output shaft 12 and the inner ring 13 of the output member 14 are coupled together for rotation in unison. The engaging hole 13a of the inner ring 13 has two width-defining surfaces defining the width of the engaging hole and opposed to the two width-defining surfaces of the engaging portion 11a of the input shaft 11 with a slight gap left therebetween, such that the rotation of the input shaft 11 is transmitted to the output shaft 12 with a slight angular delay.

The fixed member 18 is assembled by fitting the outer ring 16 and then the presser lid 17 into the inner periphery of the housing 15. The outer ring 16 is non-rotatably restricted by the housing 15 and is prevented from being pulled out of the housing 15 by the presser lid 17.

The retainer 19 includes a disk portion 19b through which the input shaft 11 extends. The pillars 19a of the retainer 19 are disposed at positions of the peripheral edge of the disk portion 19b opposed to each other. The disk portion 19b is fixedly fitted to the outer periphery of the engaging portion 11a of the input shaft 11 such that the retainer 19 rotates in unison with the input shaft 11.

Formed on the outer peripheral surface of the inner ring 13 are two first groups of cam surfaces, each first group consisting of a plurality of cam surfaces 13b continuous with each other, arranged in a row, and inclined in one predetermined direction, and two second groups of cam surfaces, each second group consisting of a plurality of cam surfaces 13c continuous with each other, arranged in a row, and inclined in the other direction. This provides, between the inner ring 13 and the outer ring 16, two first groups of wedge-shaped spaces, each first group consisting of a plurality of first wedge-shaped spaces 22a continuous with each other, arranged in a row, and narrow on one circumferential side, and two second groups of wedge-shaped spaces, each second group consisting of a plurality of second wedge-shaped spaces 22b continuous with each other, arranged in a row, and narrow on the other circumferential side. The cam surfaces 13b and 13c of the inner ring 13 are each composed of a circular arc-shaped surface. In each of the groups each consisting of a plurality of the wedge-shaped spaces 22a, 22b that are continuous with each other, a plurality of the rollers 20 are received while being abutting each other. Each pillar 19a of the retainer 19 is inserted into a position where the narrow portion of one of the first wedge-shaped spaces 22a and the narrow portion of one of the second wedge-shaped spaces 22b are circumferentially opposed to each other, The C-shaped springs 21 are made from a round wire, and have at each end thereof, a substantially "<" (Japanese character)-shaped hook portion 21 extending in the clutch axial direction. The C-shaped springs 21 are mounted while being radially elastically compressed such that the hook portion 21a at one end of each C-shaped spring 21 abuts the roller 20 at one end of the row of the rollers 20 received in one of the groups of the continuous first wedge-shaped spaces 22a, and abutting each other, and the hook portion 21a at the other end abuts the roller 20 at one end of the row of the rollers 20 received in one of the groups of the continuous second wedge-shaped spaces 22a, and abutting each other. Thus, the C-shaped springs 21 push, with the elastic force thereof, the rollers 20 into the narrow portions of the respective ones of the first and second wedge-shaped spaces 22a and 22b.

Also, as shown in FIG. 7, by setting the circular arc radius of the cam surface 13b, 13c opposed to the roller 20 at the other end of each row of the rollers 20 that abut each other (this cam surface is hereinafter referred to as the "last" cam surface) to not less than 1.5 times the circular arc radii of the cam surfaces 13b, 13c opposed to the other rollers 20 of the same row (these cam surfaces are hereinafter referred to as "the other" cam surfaces), the radius $R2_L$ of the inner ring 13 at the engaging end of $A2_L$ of the last cam surface 13b, 13c is larger than the radii R2 of the inner ring 13 at the engaging ends A2 of the other cam surfaces 13b, 13c.

In this reverse input preventive clutch, having the above-described structure, because each roller 20 is pushed into the narrow portion of a first or second wedge-shaped space 22a under the elastic force of the C-shaped springs 21 or 20, thus engaging the outer ring 16 and the inner ring 13, reverse input torque applied to the output shaft 12 in either direction will cause the output member 14 to be locked to the fixed member 18, so that the input shaft 11 does not rotate either.

On the other hand, when the input shaft 11 is rotated in either direction under input torque applied to the input shaft 11, each of the pillars 19a of the retainer 19, which rotates in unison with the input shaft 11, pushes the rollers in one of the first or second groups of the wedge-shaped spaces, which oppose, in the rotational direction, to the other first or second groups of the wedge-shaped spaces, into the wide portions thereof, against the elastic force of the C-shaped springs 21, thereby unlocking the output member 14. When then the input shaft 11 further rotates until the two width-defining surfaces of the engaging portion 11a of the input shaft engages the two width-defining surfaces of the engaging hole 13a of the inner ring 13, the rotation of the input shaft 11 is transmitted to the output shaft 12 via the inner ring 13.

In this reverse input preventive clutch, because the radius $R2_L$ of the inner ring 13 at the engaging end $A2_L$ of the last cam surface 13b, 13c of each row is larger than the radii R2 of the inner ring 13 at the engaging ends A2 of the other cam surfaces 13b, 13c of the same row, the rollers 20 are less likely to move over the engaging ends A2 and $A2_L$ of the cam surfaces 13b and 13c. This prevents roll over of the rollers even if large reverse input torque acts on the output member 14, thus reliably preventing rotation of the input shaft 11.

In this reverse input preventive clutch, too, as with the one-way clutch of the first embodiment, the cam surfaces 13b and 13c of the inner ring 13 are not limited to those shown in FIGS. 5 to 7. For example, the last cam surface 13b, 13c of each row of the inner ring 13 may be formed by a flat surface or a radially outwardly-facing concave circular arc-shaped surface (both not shown).

The embodiments disclosed above are mere examples in every respect, and should not be construed restrictive and should be understood to cover every modification within the scope and equivalent meaning of the claims.

For example, while in each of the above embodiments, a C-shaped spring or springs are used as a resilient member or members for pushing the rollers into the narrow portions of the wedge-shaped spaces, the resilient member or members may be instead a coil spring or springs or a (S-shaped, Z-shaped, V-shaped, or otherwise shaped) leaf spring or springs.

Needless to say, the present invention is applicable not only to one-way clutches and reverse input preventive clutches using rollers as the rolling elements, but also to one-way clutches and reverse input preventive clutches using rolling elements other than rollers, such as balls.

ng elements,

DESCRIPTION OF THE REFERENCE NUMERALS

1. Outer ring (outer member)
2. Inner ring (Inner member)
2a. Cam surface
3. Wedge-shaped space
4. Roller (rolling element)
5. C-shaped spring
6. Key
7. Rotary shaft
11. Input shaft (input member)
12. Output member
13. Inner ring
13b, 13c. Cam surface
14. Output member
15. Housing
16. Outer ring
17. Presser lid
18. Fixed member
19. Retainer
19a. Pillar
20. Roller (rolling element)
21. C-shaped spring
21a. Hook portion
22a. First wedge-shaped space
22b. Second wedge-shaped space
A1, A2. Engaging end (of each of the other cam surfaces)
$A1_L$, $A2_L$. Engaging end (of the last cam surface).

What is claimed is:

1. A reverse input preventive clutch comprising:
an input member and an output member configured to rotate about a common axis;
a torque transmission mechanism disposed between the input member and the output member;
a fixed member having a cylindrical surface opposed to an outer peripheral surface of the output member;
a plurality of rolling elements disposed between the output member and the fixed member; and
a cage coupled to the input member so as to rotate in unison with the input member,
wherein the torque transmission mechanism is configured to transmit rotation of the input member to the output member with a slight angular delay;
wherein first groups of cam surfaces are formed on the outer peripheral surface of the output member, each of the first groups being composed of a plurality of cam surfaces continuous with each other and inclined in a first predetermined direction,
wherein second groups of cam surfaces are formed on the outer peripheral surface of the output member, each of the second groups being composed of a plurality of cam surfaces continuous with each other and inclined in a second direction opposite the first predetermined direction,
wherein the cylindrical surface of the fixed member is opposed to the cam surfaces to define first groups of wedge-shaped spaces and second groups of wedge-shaped spaces between the output member and the fixed member, each of the first groups of wedge-shaped spaces being composed of a plurality of wedge-shaped spaces continuous with each other and narrowing in a first circumferential direction, and each of the second groups of wedge-shaped spaces being composed of a plurality of wedge-shaped spaces continuous with each other and narrowing in a second circumferential direction opposite the first circumferential direction,
wherein each of the rolling elements is received in a respective one of the wedge-shaped spaces such that the rolling elements in each of the first groups and the second groups of the wedge-shaped spaces are arranged in a row and abut each other,
wherein the reverse input preventive clutch further comprises resilient members configured to abut a respective one of the rolling elements located at a first end of each row of the rolling elements such that, under a biasing force of the resilient members, each of the rolling elements is pushed into a narrow portion of one of the wedge-shaped spaces of one of the first groups or the second groups such that the rolling elements engage the fixed member and the output member,
wherein the cage has pillars each inserted into a position where a respective one of the wedge-shaped spaces of one of the first groups is circumferentially opposed to a corresponding one of the wedge-shaped spaces of one of the second groups, and
wherein a radius of the output member at an engaging end of one of the cam surfaces opposed to a respective one of the rolling elements located at a second end of each row of the rolling elements opposite the first end of each row is larger than radii of the output member at engaging ends of the cam surfaces opposed to remaining rolling elements of the same row as the respective one of the rolling elements, the one of the cam surfaces and the respective one of the rolling elements located at the second end abutting each other.

2. The reverse input preventive clutch of claim 1, wherein the cam surfaces of the output member are each formed of a radially outwardly-facing convex circular arc-shaped surface, and a circular arc radius of the cam surface opposed to the respective one of the rolling elements located at the second end of each row of the rolling elements is larger than circular arc radii of the cam surfaces opposed to the remaining rolling elements of the same row as the respective one of the rolling elements.

3. The reverse input preventive clutch of claim 2, wherein the circular arc radius of the cam surface opposed to the respective one of the rolling elements located at the second end of each row of the rolling elements is not less than 1.5 times the circular arc radii of the cam surfaces opposed to the remaining rolling elements of the same row as the respective one of the rolling elements.

4. The reverse input preventive clutch of claim 1, wherein, of the cam surfaces of the output member, the cam surface opposed to the respective one of the rolling elements located at the second end of each row of the rolling elements is formed of one of a flat surface and a radially outwardly-facing concave circular arc-shaped surface.

* * * * *